No. 739,374. PATENTED SEPT. 22, 1903.
C. E. BAKER & A. W. BURWELL.
PROCESS OF TREATING REFRACTORY COMPLEX ORES OF GOLD AND SILVER.
APPLICATION FILED NOV. 11, 1902.
NO MODEL.
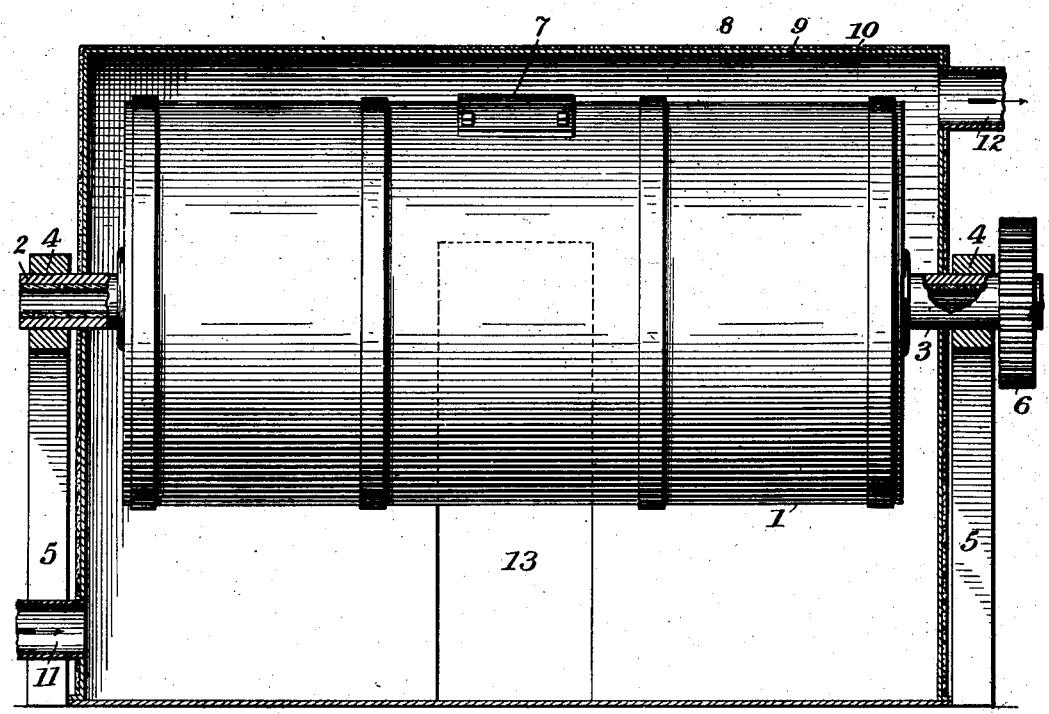
Witnesses:
R A Balderson
N. E. Neff
Inventors
Charles E. Baker,
Arthur W. Burwell,
By Byrnes & Townsend
Att'ys.

No. 739,374. Patented September 22, 1903.

UNITED STATES PATENT OFFICE.

CHARLES E. BAKER AND ARTHUR W. BURWELL, OF CLEVELAND, OHIO.

PROCESS OF TREATING REFRACTORY COMPLEX ORES OF GOLD AND SILVER.

SPECIFICATION forming part of Letters Patent No. 739,374, dated September 22, 1903.

Application filed November 11, 1902. Serial No. 130,843. (No specimens.)

*To all whom it may concern:*

Be it known that we, CHARLES E. BAKER and ARTHUR W. BURWELL, citizens of the United States, residing at Cleveland, in the county of Cuyahoga and State of Ohio, have invented certain new and useful Improvements in Processes of Treating Refractory Complex Ores of Gold and Silver, of which the following is a specification.

This process is especially intended for the treatment of ores of gold and silver containing base metals, such as iron, copper, zinc, or lead, combined with a metalloid. It is especially intended for the treatment of ores in which the metalloid will combine with chlorin to form a volatile chlorid, such as sulfids, arsenids, antimonids, and selenids.

The process, generally stated, consists in treating raw crushed ore or concentrates with chlorin while subjected to a temperature sufficient to cause the chlorin to combine with the metalloid to produce a volatile chlorid, which is driven off and may be condensed. The base metals present also combine with chlorin to form soluble protochlorids. The gold is liberated in a free state and the silver is converted into a chlorid. To obtain the best results, both the ore and chlorin should be dry and the ore should be agitated to increase the speed of the reaction. The residue left after the metalloid is driven off is then treated with water, whereby the base-metal chlorids are brought into solution, while the free gold and silver chlorid remain with the gangue and may be separately recovered.

The process may be carried out by the use of any suitable apparatus. One which has been employed is shown in the accompanying drawing, in which the figure is a vertical longitudinal section showing the ore-drum in elevation.

The apparatus shown comprises a revolving drum 1, preferably of boiler-iron lined with porcelain. This drum has hollow trunnions 2 3, also lined with porcelain, which are supported in journal-boxes 4, carried by standards 5. A gear-wheel 6 for rotating the drum is secured on trunnion 3. The drum has a suitable opening 7 for receiving and discharging its contents. Surrounding the drum is a chamber 8, which may be of boiler-iron 9 with a covering 10 of asbestos. A flue 11 opens into chamber 8 at one end and near its base, serving for the introduction of heating-gases. A flue 12 for discharging the waste gases leads from the other end of the chamber near its top. A door 13 in one side of the chamber gives access to the drum for the purpose of charging and discharging it.

For the sake of illustration the process will be described as carried out on an ore containing gold, silver, and iron combined with sulfur. The ore is crushed to about fifty mesh and a sufficient amount is placed in the drum to one-third fill it. The drum is now set in rotation and its contents heated to about 150° centigrade, preferably by waste products of combustion introduced through flue 11. Dry chlorin gas is then introduced through trunnion 2 and combines with the sulfur to form sulfur chlorid, ($S_2Cl_2$.) This chlorid, however, volatilizes at a temperature of 138° centigrade, and is therefore driven off as rapidly as formed, escaping through trunnion 3, whence it is delivered to a suitable condenser and liquefied. The iron or other base metal in the ore is thus converted into a protochlorid, and care must be taken to discontinue the introduction of chlorin gas at the precise moment when all of the sulfur has been removed, which can be determined by the fact that chlorin only then escapes through trunnion 3. This is necessary to prevent conversion of the ferrous chlorid into the more volatile ferric chlorid, which might be driven off with the sulfur chlorid. The residual mass is now treated with water, either in the drum or in a separate vessel, whereby the iron or other base-metal chlorid is brought into solution, while the gold and silver remain in the gangue, the gold in a free state and the silver as a chlorid. No gold goes into solution, since its chlorid is reduced by ferrous chlorid. The gold and silver are recovered by amalgamation or otherwise. The ferrous chlorid solution is preferably electrolyzed with insoluble anodes to give chlorin for use in the process and metallic iron, which may be briqueted and melted down.

The process is substantially the same when applied to arsenids, antimonids, &c., a suitable temperature being employed to effect the production and volatilization of the metalloid chlorid without volatilizing the base-metal chlorid.

We claim—

1. The process of treating ores of gold and silver containing a base metal or metals and a metalloid, which consists of combining the metalloid with chlorin, and vaporizing and separating the metalloid chlorid from the base metals in the ore, as set forth.

2. The process of treating ores of gold and silver containing a base metal or metals and a metalloid, which consists of combining the metalloid, base metal and silver, if present, with chlorin, and vaporizing and separating the metalloid chlorid from the base metals in the ore, as set forth.

3. The process of treating ores of gold and silver containing a base metal or metals and a metalloid, which consists of combining the metalloid with chlorin by bringing chlorin into contact with the ore while hot, and vaporizing and separating the metalloid chlorid from the base metals in the ore, as set forth.

4. The process of treating ores of gold and silver containing a base metal or metals and a metalloid, which consists of combining the metalloid, base metal and silver, if present, with chlorin by bringing chlorin into contact with the ore while hot, and vaporizing and separating the metalloid chlorid from the base metals in the ore, as set forth.

5. The process of treating ores of gold and silver containing a base metal or metals and a metalloid, which consists of combining the metalloid with chlorin by bringing dry chlorin into contact with the dry ore while hot, and vaporizing and separating the metalloid chlorid from the base metals in the ore, as set forth.

6. The process of treating ores of gold and silver containing a base metal or metals and a metalloid, which consists of combining the metalloid, base metal and silver, if present, with chlorin by bringing dry chlorin into contact with the dry ore while hot, and vaporizing and separating the metalloid chlorid from the base metals in the ore, as set forth.

7. The process of treating ores of gold and silver containing a base metal or metals and a metalloid, which consists of combining the metalloid, base metal and silver, if present, with chlorin, vaporizing and separating the metalloid chlorid from the base metals in the ore, and dissolving and removing the base-metal chlorid, as set forth.

8. The process of treating ores of gold and silver containing a base metal or metals and a metalloid, which consists of combining the metalloid, base metal and silver, if present, with chlorin, vaporizing and separating the metalloid chlorid from the base metals in the ore, dissolving and removing the base-metal chlorid, and electrolyzing the chlorid solution to obtain the base metal and free chlorin, as set forth.

9. The process of treating ores of gold and silver containing a base metal or metals and a metalloid, which consists of combining the metalloid, base metal and silver, if present, with chlorin, vaporizing and separating the metalloid chlorid from the base metals in the ore, dissolving and removing the base-metal chlorid, and separately recovering the gold and silver, as set forth.

10. The process of treating ores containing a base metal or metals and a metalloid, which consists of combining the metalloid with chlorin, and vaporizing and separating the metalloid chlorid from the base metals, as set forth.

11. The process of treating ores containing a base metal or metals and a metalloid, which consists of combining the base metal and metalloid with chlorin by bringing dry chlorin into contact with the dry ore while hot, and vaporizing and separating the metalloid chlorid from the base metal chlorid, as set forth.

In testimony whereof we affix our signatures in presence of two witnesses.

CHARLES E. BAKER.
ARTHUR W. BURWELL.

Witnesses:
A. C. BOWEN,
S. E. STONE.